United States Patent
Lins de Medeiros et al.

(10) Patent No.: US 9,584,218 B2
(45) Date of Patent: Feb. 28, 2017

(54) METHOD AND ARRANGEMENT FOR MONITORING OPTICAL TRANSMISSION LINES

(71) Applicant: Telefonaktiebolaget L M Ericsson (publ), Stockholm (SE)

(72) Inventors: Eduardo Lins de Medeiros, Norrtälje (SE); Kim Laraqui, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/440,115

(22) PCT Filed: Nov. 15, 2012

(86) PCT No.: PCT/EP2012/072711
§ 371 (c)(1),
(2) Date: May 1, 2015

(87) PCT Pub. No.: WO2014/075725
PCT Pub. Date: May 22, 2014

(65) Prior Publication Data
US 2015/0288445 A1      Oct. 8, 2015

(51) Int. Cl.
*H04B 10/079* (2013.01)
*H04B 10/03* (2013.01)
(Continued)

(52) U.S. Cl.
CPC ............ *H04B 10/079* (2013.01); *H04B 10/03* (2013.01); *H04B 10/25752* (2013.01);
(Continued)

(58) Field of Classification Search
CPC . H04B 10/079; H04B 10/03; H04B 10/25752; H04L 41/0645; H04L 41/0681; H04L 41/0677; H04W 88/085
(Continued)

(56) References Cited

U.S. PATENT DOCUMENTS

| 7,738,787 | B2 | 6/2010 | Nakajima et al. |
| 2008/0089689 | A1* | 4/2008 | Sakama ............... H04W 88/085 398/115 |

(Continued)

FOREIGN PATENT DOCUMENTS

| EP | 2166791 A2 | 3/2010 |
| EP | 2226954 A1 | 9/2010 |

(Continued)

OTHER PUBLICATIONS

Fujikura, "Optical Fiber Monitoring System", Company product web page, last updated Apr. 1, 2012, retrieved on Jun. 5, 2015, pp. 1-2, retrieved from internet: http://www.fujikura.co.jp/eng/products/tele/o_f_maintenance/td13001.html.

(Continued)

*Primary Examiner* — Dalzid Singh
(74) *Attorney, Agent, or Firm* — Coats & Bennett, PLLC

(57) ABSTRACT

There is proposed a mechanism for monitoring optical fibers (1) in an optical backhaul network that connects nodes (10, 20) of a distributed radio base station system. The nodes carry data streams using the Common Public Radio Interface (CPRI) protocol. The method includes: receiving from at least one node a CPRI alarm indicative of a transmission failure in a CPRI data stream, and triggering fault analysis of an optical fiber identified as carrying the CPRI data stream. Using CPRI alarms that are generated by transmission failures between nodes as a trigger for monitoring the physical fiber carrying the CPRI streams provides a targeted mechanism for determining fiber failures, which had a low response time and thus enables rapid repair of any fault and minimal disruption to the network.

18 Claims, 5 Drawing Sheets

(51) Int. Cl.
  *H04B 10/2575* (2013.01)
  *H04L 12/24* (2006.01)
  *H04W 76/00* (2009.01)
  *H04W 88/08* (2009.01)

(52) U.S. Cl.
  CPC ...... *H04L 41/0645* (2013.01); *H04L 41/0681* (2013.01); *H04L 41/0677* (2013.01); *H04W 88/085* (2013.01)

(58) Field of Classification Search
  USPC .......................................................... 398/20
  See application file for complete search history.

(56) References Cited

U.S. PATENT DOCUMENTS

| | | | |
|---|---|---|---|
| 2010/0074121 A1* | 3/2010 | Sakama | H04W 24/00 370/248 |
| 2010/0075678 A1* | 3/2010 | Akman | H04L 43/50 455/436 |
| 2011/0311220 A1 | 12/2011 | Nakajima et al. | |
| 2012/0157089 A1 | 6/2012 | Yang et al. | |
| 2012/0204084 A1* | 8/2012 | Zhang | H04W 24/08 714/807 |

FOREIGN PATENT DOCUMENTS

| | | |
|---|---|---|
| WO | 2005064827 A1 | 7/2005 |
| WO | 2012087205 A1 | 6/2012 |
| WO | 2012169946 A1 | 12/2012 |

OTHER PUBLICATIONS

Fujikura, "FiMO: Fiber Monitoring System", Product Brochure, last updated Apr. 1, 2012, retrieved on Jun. 5, 2015, pp. 1-2, retrieved from internet: http://www.fujikura.co.jp/eng/products/tele/o_f_maintenance/td13001.html.

Optical Zonu Corporation, "iSFC® Micro-OTDR Transceiver Series Fast Fiber Fault Finder", Aug. 1, 2012, pp. 1-4, retrieved on Jun. 5, 2015, retrieved from internet: http://www.opticalzonu.com/wp-content/uploads/downloads/2014/11/DRAFT-iSFC-uOTDR-GbE-Product-Data-Sheet-3.0.pdf.

Optical Zonu Corporation, "iSFC Transceiver with Built-In micro OTDR", Aug. 1, 2012, p. 1, retrieved on Jun. 5, 2015, retrieved from internet: http://www.opticalzonu.com/sfc/otdrsfc/.

Telcordia, "Test Expert", Product brochure, Jan. 1, 2008, pp. 1-4.

Telcordia, "Telcordia® Test Expert Test Management Solution", Product Presentation, Mar. 15, 2012, pp. 1-20.

Ericsson AB, et al., "Common Public Radio Interface (CPRI), Interface Specification", Interface Specification, CPRI Specification V5.0, Sep. 21, 2011, pp. 1-119.

* cited by examiner

METHOD AND ARRANGEMENT FOR MONITORING OPTICAL TRANSMISSION LINES

TECHNICAL FIELD

The invention is concerned with the monitoring of optical transmission lines and specifically optical lines used in a mobile backhaul network connecting radio equipment control to remote radio units.

BACKGROUND

In mobile communication networks, the radio base stations (RBS) are increasingly designed in such a way that the air interface is physically separated from the baseband signal processing. In practice, this means that radio equipment controllers (REC), which perform the baseband processing, are arranged at one location while the radio equipments (RE) are arranged at locations remote from the RECs, often on antenna masts, rooftops, roadsides, etc. In a distributed RBS, an RE is also referred to as a remote radio unit (RRU). This configuration allows the bulk of the processing to be performed remotely in a centralised fashion, which simplifies the design of the radio site. In effect, it enables all RECs to be located in a single physical site within a controlled environment. This kind of system architecture with centralised processing units is often referred to as Centralised Baseband (CBB), but is also often referred to as Centralised Radio Access Network (C-RAN) or baseband hotel.

In a distributed RBS or CBB, an REC is connected to REs via a backhaul network, which is typically an optical fiber network. The backhaul network must comply with the necessary requirements for data rates, bit error rate (BER), delay and delay variation. One manner of achieving this is to use the Common Public Radio Interface protocol or CPRI defined in "CPRI Specification V5.0 (2011 Sep. 21)" available at http://www.cpri.info/spec.html. CPRI is a layer 2 protocol which defines the signalling and control operations for transmitting digitised radio signal samples from REs to the processing units and vice-versa. Providing that the bandwidth, maximum delay, delay variation and BER requirements are met, CPRI can be run over different physical media, such as optical fibers, copper wires or even microwave links.

As each optical fiber in the backhaul network may be used to carry traffic from multiple mobile subscribers, it is essential that any failure in the backhaul network is detected promptly and communication restored with minimum delay.

Conventional fiber monitoring systems use reflectometry techniques to detect faults by transmitting test signals through a fiber and analysing the reflections. They are generally stand alone systems which can be customised to interact with an operator's Operations, Administration and Maintenance (OAM) system. For example, it is known to provide a manually operated fiber monitoring system in an access network that is configured as a passive optical network (PON), where the fiber condition is tested after a customer has complained. A fiber monitoring system operated in this way is not suitable for mobile backhaul optical fiber networks, because the downtime caused by a fiber fault can affect many mobile subscribers and cause substantial losses for the operator.

U.S. patent application No. US 2011/0311220 A1 and U.S. Pat. No. 7,738,787 both describe optical transmission line monitoring apparatus that use optical time domain reflectometry (OTDR) to continuously poll the status of each optical fiber in turn. Whilst these arrangements may react faster than a manually operated monitoring system, they are subject to scalability problems, as the time needed to poll all fibers increases with each additional managed fiber. A reduction in the total testing time can only be achieved by reducing the sampling rate for each fiber and thus at the expense of OTDR accuracy.

A further fiber monitoring arrangement and method is described in WO 2012/087205. In this arrangement a test procedure is triggered by an alarm received from a terminal device as a result of non-standardized performance parameters measured as part of an Optical Transceiver Monitoring (OTM) arrangement. The detection trigger is based on hard thresholds, e.g. absolute received power levels, which requires careful control of the operating conditions of such a system. Optical power measurements made using the same equipment, but at different operating temperatures can differ substantially.

SUMMARY

There is thus a need for an optical line monitoring system and method that can overcome the disadvantages of prior art systems and respond rapidly to failures in individual optical lines.

The above is achieved in a method, a computer program product, a trigger module and a fiber monitoring system as defined in the appended claims.

More specifically, the invention resides in a method of monitoring optical fibers in an optical backhaul network that connects nodes of a distributed radio base station system, wherein the nodes carry data streams using the Common Public Radio Interface, CPRI protocol. The method includes: receiving from at least one node a CPRI alarm indicative of a transmission failure in a CPRI data stream, and triggering fault analysis of an optical fiber identified as carrying the CPRI data stream.

Using CPRI alarms that are generated by transmission failures between nodes as a trigger for monitoring the physical optical fiber carrying the CPRI streams provides a targeted mechanism for determining optical fiber failures, which have a low response time and thus enables rapid repair of any fault and minimal disruption to the network.

In a preferred embodiment, and where the network topology is complex with traffic aggregation nodes, the method includes obtaining information mapping data streams to physical optical fibers from the at least one node, wherein the step of triggering fault analysis includes identifying an optical fiber carrying the CPRI data stream.

In order to eliminate spurious alarms, the method preferably ensures that the CPRI alarm is maintained for at least a predetermined time period before triggering fault analysis of the identified optical fiber.

In a particularly advantageous embodiment of the invention the method further comprises triggering fault analysis of the identified optical fiber only after ascertaining receipt of at least one CPRI alarm indicative of a transmission failure in a further CPRI data stream carried by the identified optical fiber in a first time interval and ensuring that all received CPRI alarms indicative of transmission failure on CPRI data streams carried by the identified optical fiber are maintained for a predetermined second time interval. Awaiting further alarms in CPRI data streams carried by the same optical fiber and that these CPRI alarms are maintained for a certain timer period before triggering fault analysis ensures that the CPRI alarms are indeed indicators of a fiber fault and are not spurious alarms caused by isolated errors in one or more CPRI data streams.

In a preferred embodiment the triggering of fault analysis includes transmitting a control message via the optical backhaul network to a measurement element in a node coupled to the identified optical fiber and receiving measurement data from the measurement element via said node. Making use of the existing network to convey control signals to and from measurement elements simplifies the deployment of multiple measuring elements throughout the optical backhaul network with minimum installation cost. This, in turn, ensures rapid, and reliably targeted fault detection of the optical fibers. In a particularly advantageous embodiment the control message is transmitted using the CPRI protocol.

In accordance with a second aspect, the invention resides in a computer programme product including a computer readable medium having computer readable program code stored therein for causing a computer to monitor optical fibers in an optical backhaul network that connects nodes of a distributed radio base station system, wherein the nodes carry data streams using the CPRI protocol in accordance with the method described above.

The invention further resides in a trigger module adapted to trigger fault analysis of optical fibers in an optical backhaul network connecting nodes of a distributed radio base station system. The trigger module is configured to communicate with a fiber monitoring system and with at least one node of the optical backhaul network that is configured to terminate at least one data stream using the Common Public Radio Interface, CPRI, protocol. The trigger module comprises a receiver module configured to receive CPRI alarms from the at least one node, where each said CPRI alarm indicates a transmission failure in a CPRI data stream. The trigger module further comprises a trigger processing module coupled to the receiver module and configured to respond to a CPRI alarm received from the at least one node by identifying an optical fiber carrying the CPRI stream to which the alarm relates, and sending a trigger signal to the fiber monitoring system to initiate fault analysis of an optical fiber identified as carrying the CPRI stream to which the CPRI alarm relates.

Preferably, the trigger module comprises a registration module configured to obtain information from the at least one node mapping CPRI data streams to optical fibers carrying the CPRI data streams prior to receiving CPRI alarms from the at least one node. In this way, the trigger module is able to adapt to any change in network topology by obtaining the latest information from the network itself.

In a particularly advantageous embodiment, the trigger module further comprises a processor configured to respond to receipt of a CPRI alarm by setting a timer and to send the triggering signal to the fiber monitoring system only if the CPRI alarm is maintained upon elapse of an interval defined by the first timer. This ensures that spurious alarms are ignored and do not provoke a time intensive fault analysis.

In a still more robust embodiment, the trigger module comprises a processor configured to respond to receipt of a CPRI alarm by setting a first timer and a second timer, wherein the processor is configured to set the second timer only if at least one CPRI alarm that relates to a further CPRI stream carried by the identified optical fiber is received during the interval defined by the first timer, said processor further being configured to send said triggering signal to the fiber monitoring system only if all received CPRI alarms are maintained upon elapse of an interval defined by the second timer. By ensuring that CPRI alarms have been received that pertain to more than one CPRI stream carried by one and the same optical fiber and that these alarms are maintained for a certain time period, the reliability of the CPRI alarms is still greater. Thus the fault analysis is triggered when there is a real likelihood of fiber failure.

In accordance with a further aspect, the invention resides in a fiber monitoring system that is triggered to perform fault analysis by the detection of CPRI alarms. Thus the invention resides in a fiber monitoring system comprising at least one measurement element for performing fault analysis of optical fibers, a controller and a trigger module configured to trigger fault analysis of optical fibers in an optical backhaul network connecting nodes of a distributed radio base station. The trigger module is configured to communicate with at least one node of the optical backhaul network, the node being configured to terminate at least one data stream using the Common Public Radio Interface protocol, CPRI. The trigger module comprises a receiver module configured to receive CPRI alarms from the node, each CPRI alarm indicating a transmission failure in a CPRI stream. The said trigger module further comprises a trigger processing module coupled to the receiver module and configured to respond to a CPRI alarm received from the node by sending a trigger signal to the controller to initiate fault analysis of an optical fiber identified as carrying a CPRI stream to which the CPRI alarm relates by at least one measurement element.

Preferably, the trigger module further comprises a registration module configured to obtain information from the at least one node mapping data streams to optical fibers carrying said CPRI data streams prior to receiving CPRI alarms from the at least one node.

In a particularly advantageous embodiment, the fiber monitoring system does not respond to spurious CPRI alarms when the trigger module further comprises a processor configured to respond to receipt of a CPRI alarm by setting a timer and to send the triggering signal to said controller only if said CPRI alarm is maintained upon elapse of an interval defined by said first timer.

In an alternative arrangement the fiber monitoring system that is still more robust when trigger module further comprises a processor configured to respond to receipt of a CPRI alarm by setting a first timer and a second timer, wherein said processor is configured to set said second timer only if at least one CPRI alarm that relates to a further CPRI stream carried by the identified optical fiber is received during the interval defined by said first timer, said processor further being configured to send said triggering signal to said fiber monitoring system only if all received CPRI alarms are maintained upon elapse of an interval defined by said second timer. Fault analysis of a particular optical fiber is thus only triggered when CPRI alarms are received and maintained that relate to multiple CPRI streams carried by the fiber.

In a preferred arrangement of the present invention, the at least one measurement element is comprised in a node of the optical backhaul network and the controller is configured to send a control signal to initiate fault analysis to at least one measurement element via said optical backhaul network. Distributing measurement elements in nodes within the optical backhaul network simplifies the fault analysis while controlling each measurement element using control signals sent via the network simultaneously facilitates the deployment of the measurement elements. Such an arrangement is particularly suitable for networks incorporating opto-electrical-opto conversion. This is still further simplified, with minimum disruption to the existing network when the controller is configured to send said control signal using CPRI protocol.

In a preferred embodiment, the controller is further configured to receive fault analysis data from said at least one measurement element via said optical backhaul network, preferably using CPRI protocol.

BRIEF DESCRIPTION OF THE DRAWINGS

Further objects and advantages of the present invention will become apparent from the following description of the preferred embodiments that are given by way of example with reference to the accompanying drawings. In the figures.

DETAILED DESCRIPTION

Figure 1:
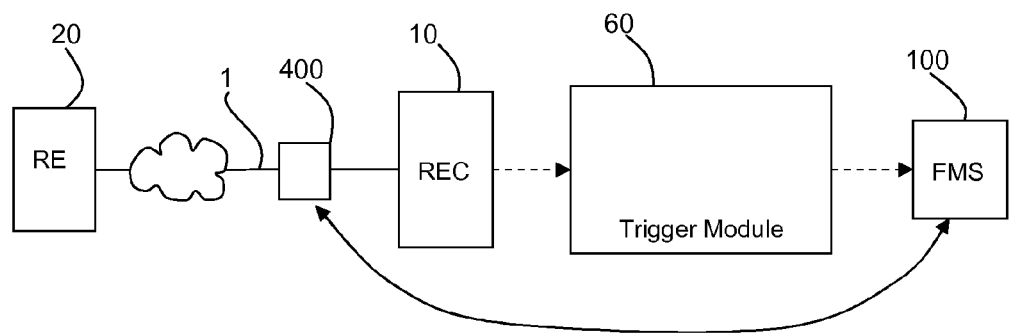
FIG. 1 schematically illustrates the architecture of a FMS with CPRI-based trigger on an optical fiber between an REC and RE.

FIG. 1 is a schematic representation of part of an optical backhaul network connecting nodes of a distributed RBS. More specifically, one optical fiber link 1 is illustrated which connects a radio equipment control, REC, 10 with a radio equipment RE 20. A fiber monitoring system, FMS, 100 capable of acquiring measurement data and performing fault analysis on an optical fiber is coupled to the optical fiber 1 via a coupling element 400. In FIG. 1, the coupling element 400 is shown as separate from the FMS 100. However, it is possible that FMS 100 incorporates coupling elements 400. A trigger module 60 is provided, which supplies a trigger signal to the FMS 100 to initiate fault analysis of a specific optical fiber 1 as illustrated by the dashed arrow. The trigger module 60 also communicates with the REC 10 as shown by the dashed arrow between these two elements. In the illustrated part of the optical backhaul network, the REC 10 is connected to one RE 20 via a point-to-point optical fiber link 1 and the coupling element 400 is connected to the fiber 1. However, it will be understood by those skilled in the field of mobile communication systems that one REC 10 can be connected to multiple REs 20, in which case the fiber 1 departing from the REC 10 would be a feeder fiber that branches into several fibers connecting the REs 20. In such an arrangement, however, a single coupling element 400 is sufficient provided it is connected to the feeder fiber departing from the REC 10.

Figure 2:
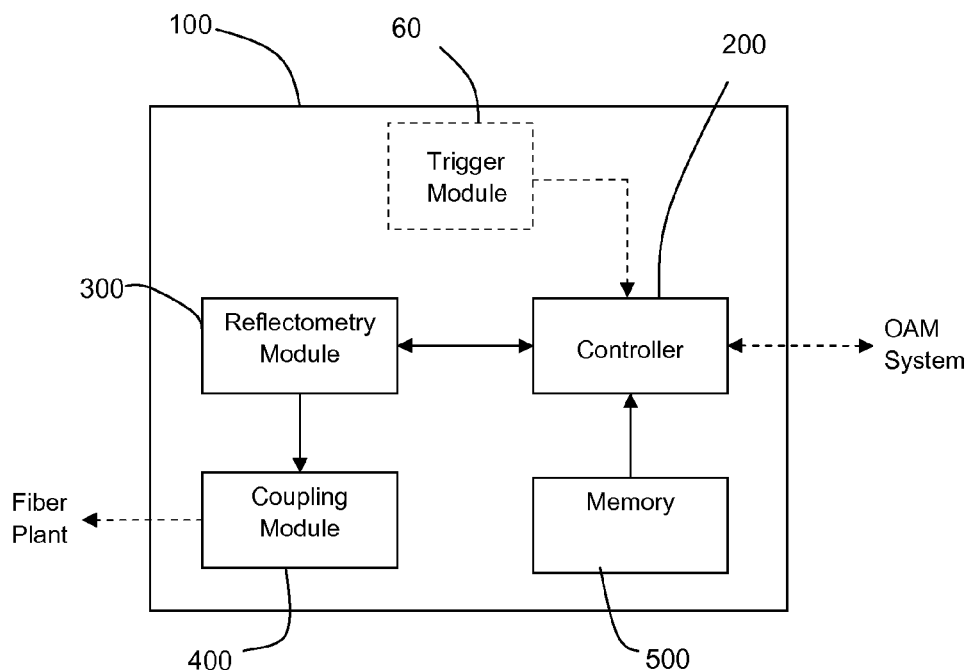
FIG. 2 is a block diagram of a fiber monitoring system, FIGS. 3a-3c schematically illustrate point-to-point CPRI links between and REC and one or more REs in a distributed RBS, FIGS. 4a-4c schematically illustrate complex network topologies in a CPRI-based distributed RBS, FIG. 5 schematically illustrates the functional elements making up the trigger module in accordance with the present invention, FIG. 6 Shows an overview of triggering fault analysis of optical fibers using CPRI.

The FMS 100 is schematically illustrated in more detail in FIG. 2. It comprises a controller 200, a memory 500 for storing and supplying topology information on the structure of a fiber plant to which it is coupled and reference data or measurements used to assess the state of an optical fiber, a reflectometry module 300 and coupling module 400, via which test signals from the reflectometry module 300 are sent to and from the fiber plant. The fiber plant is the network of optical fibers making up the optical mobile backhaul network and includes point-to-point links as embodied by the optical fiber 1 of FIG. 1 as well as more complex topologies as will be described below. The controller 200 further communicates with the RBS operator's Operations, Administration and Maintenance system (OAM) and signals detected faults in the fiber plant, to enable the fiber or fibers concerned to be repaired. The reflectometry module 300 can use any suitable known technology, such as Optical Time Division Reflectometry (OTDR) or Frequency Time Division Reflectometry (OFDR) and the coupling module 400 is arranged in a known manner to couple the reflectometry signals to and from an optical fiber such that the test signals have a negligible impact on the data transmitted via the fiber link. One example of a suitable coupling module is a Wavelength Division Multiplex WDM filter. Another possibility is to use a transceiver with built-in reflectometry capabilities. Examples of this include the ZonuFx smart SFC transceiver series with built-in OTDR available from Optical Zonu Corporation, Van Nuys, Calif., US. The controller 200 and reflectometry module 300 may be software modules running on any suitable computer or processor with associated memory. The trigger module 60 may also form part of the FMS 100 and communicate with controller 200 as illustrated by the dashed lines.

In operation, the reflectometry module 300 sends test signals to the fiber plant via the coupling module 400, analyses the reflections and outputs a trace, or set of elements describing the properties of the optical fiber 1 being tested. The controller 200 compares the measurements received from the reflectometry module 300 with the reference data for each optical fiber. It also controls the operation of the various FMS modules, determining when the reflectometry module should perform analysis and in which fiber. The controller 200 also controls the interaction with the OAM system, reporting faults when these are detected.

In accordance with the present invention, the controller 200 also receives signals from the trigger module 60 identifying optical fibers that may be faulty and require fault analysis. The trigger module 60 identifies optical fibers that may be faulty by obtaining information from one or more RECs 10 and possibly REs 20 in the optical backhaul network and specifically by listening in to specific alarm messages transmitted between RECs 10 and/or REs 20.

Figure 3A:
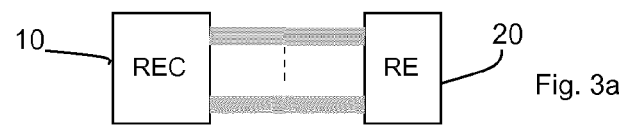
Figure 3B:
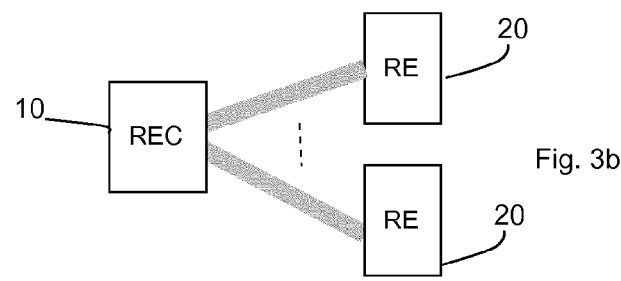
Figure 3C:
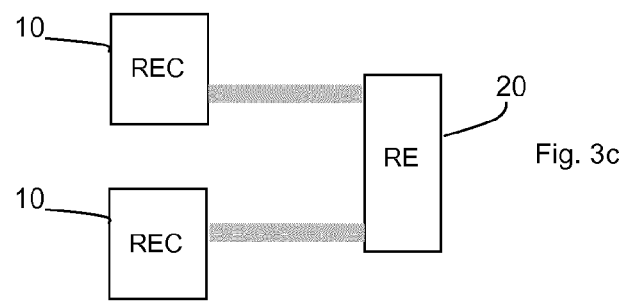

In accordance with the present invention, the optical network connecting the RECs 10 and REs 20 of the RBS runs the Common Public Radio Interface, or CPRI, protocol that is defined in the "Common Public Radio Interface Specification", version 5.0, http://www.cpri.info/spec.html, 2011. CPRI was developed to provide a common internal interface for distributed RBSs and specifically defines the interface between the REC 10 and RE 20. CPRI primarily defines the transport, connectivity and control between these two entities. The REC 10 and RE 20 entities are also called nodes. Each node may have master and slave ports. In order to run CPRI, the REC 10 must have at least one master port. Optionally, the REC 10 can have other ports that may be slave or master. The RE entity 20 must have at least one slave port, but may have other ports that may be slave or master. A CPRI link is established between one master port and one slave port. Thus a CPRI link can be established between one REC 10 and one RE 20 or between the master port of one RE 20 and a slave port of a further RE 20. Data is sent in hyperframes in a CPRI stream over a CPRI link. This means that a single optical fiber connecting a REC 10 and RE 20 can provide multiple CPRI links and thus carry multiple CPRI streams. The concept of a CPRI link is illustrated by the point-to-point topologies shown in FIGS. 3a to 3c. In each of the point-to-point topologies shown in FIGS. 3a to 3c, the CPRI links are established between master ports in the REC 10 and slave ports in the RE 20.

Figure 4A:
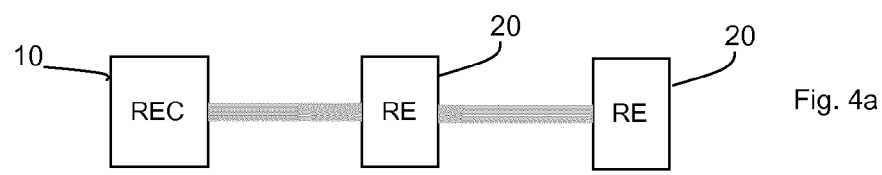
Figure 4B:
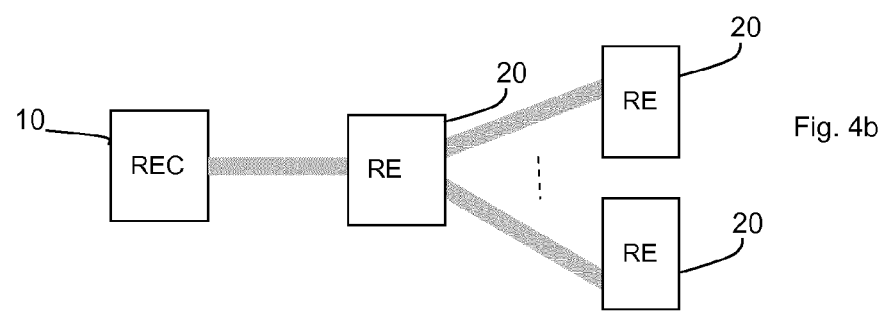
Figure 4C:
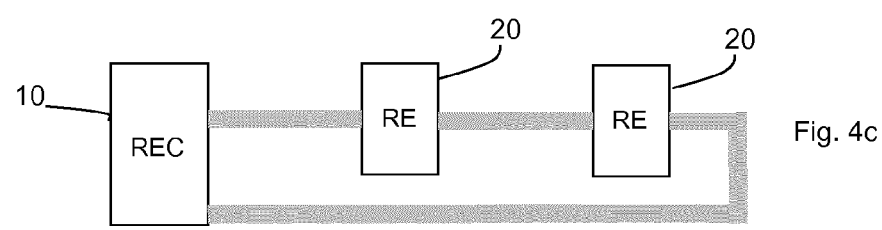

More complex CPRI network topologies are depicted in FIGS. 4a to 4c. In these advanced CPRI topologies, multiple RE entities 20 can be "daisy-chained". In this case, some RE entities 20 have both master and slave ports. For some CPRI links, the RE 20 would act as a master while in others it would act as a slave.

The CPRI specification defines four layer 1 link maintenance alarms. For each one of these alarms, one bit is allocated in the CPRI hyperframe. On detection of an alarm condition, the near-end alarm bit is set and forwarded to the other side. When the alarm is cleared the bit is reset.

The alarm conditions are detected and signaled on each CPRI link, i.e. between one master and one slave port. In more complex topologies, such as tree, star or ring topologies, CPRI alarms can be aggregated and forwarded to the REC 10 via the application layer.

The CPRI link maintenance alarm mechanism provides a fast way to signal the occurrence of faults in the physical optical fiber. Moreover. as the CPRI protocol employs symmetrical data paths, serious fiber faults, such as a fiber break, can still be detected by both nodes, even though the alarm indication may not be delivered. More specifically, the lack of signal from a remote node in an expected timeframe is interpreted as an alarm condition.

Among the CPRI alarms, three are of interest to the present invention. These are the loss of signal (LOS) alarm, loss of frame (LOF) alarm and remote alarm indication (RAI). The LOS alarm is raised when a certain number of code violations occur during the reception of one CPRI hyperframe. For optical mode CPRI, a LOS alarm can also be raised when the received optical power drops below a certain threshold. The LOF alarm is raised when the hyperframe alignment cannot be achieved, i.e. when link synchronism is lost. The RAI alarm is raised when any transceiver-related failure is detected. This includes both LOS and LOF.

Figure 5:
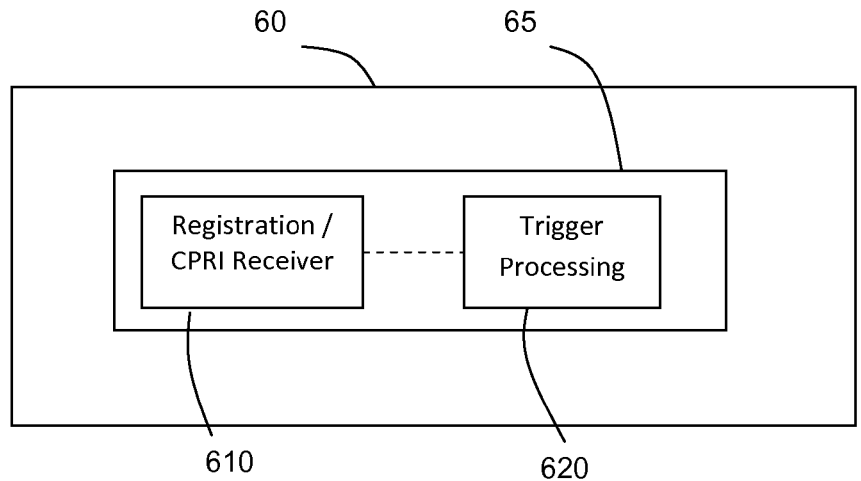

As shown in FIG. 5, the trigger module 60 is provided with a processor or computer 65 that runs software elements. The computer 65 may be located in the FMS 100, in an REC 10 or other node or as a separate unit connected to both the FMS 100 and one or more nodes 10, 20. FIG. 5, shows a schematic representation of the functional elements of the trigger module 60 which may be run as separate or combined software elements. The first function module is a registration/CPRI receiver module 610. A second module is a trigger processor module 620. The registration/CPRI receiver module 610 controls the registration of the trigger module 60 with an REC 10. After registration, the REC 10 forwards CPRI alarms of interest, or at least a notification of the receipt of a CPRI alarm of interest, to the registration/CPRI receiver module 610, which forwards this to the trigger processor module 620. The registration/CPRI receiver module 610 is depicted as a single element, however it will be understood to one skilled in the art that the two functions of registration and CPRI receipt can be carried out by separate modules. The registration/CPRI receiver module 610 may also receive information from the REC 10 mapping CPRI streams to physical optical fibers. This information is forwarded to the trigger processor module 620. When a CPRI alarm is received, the trigger processor module 620 determines which optical fiber 1 is concerned and also whether the CPRI alarm indicates a fiber fault. If the trigger processor module 620 determines that a fault is present, this information is forwarded to the FMS 100 triggering fault analysis of the optical fiber concerned.

Figure 6:
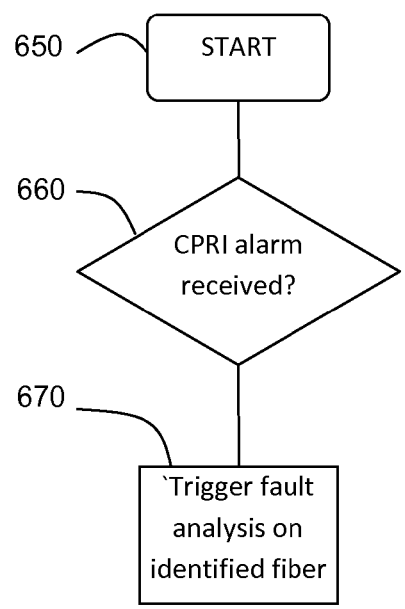

The function of the trigger module 60 is broadly illustrated by the flow diagram of FIG. 6, At the start or the process at point 650, it is assumed that the trigger module 60 is capable or receiving CPRI alarms from a CPRI node, i.e. either an REC 10 or an RE 20, possibly following registration with the same. The trigger module 60 then awaits receipt of an CPRI alarm. This is received at event 660. The trigger module 60 then sends a trigger signal identifying the fiber carrying the CPRI data stream to which the CPRI alarm relates to the FMS 100 to commence fault analysis of this fiber at step 670. It will be appreciated that using a CPRI alarm as a trigger to test an optical fiber provides a rapid and reliable method of targeting possible fiber faults in a manner that is not dependent on a vendors equipment or on operating conditions.

Figure 7:
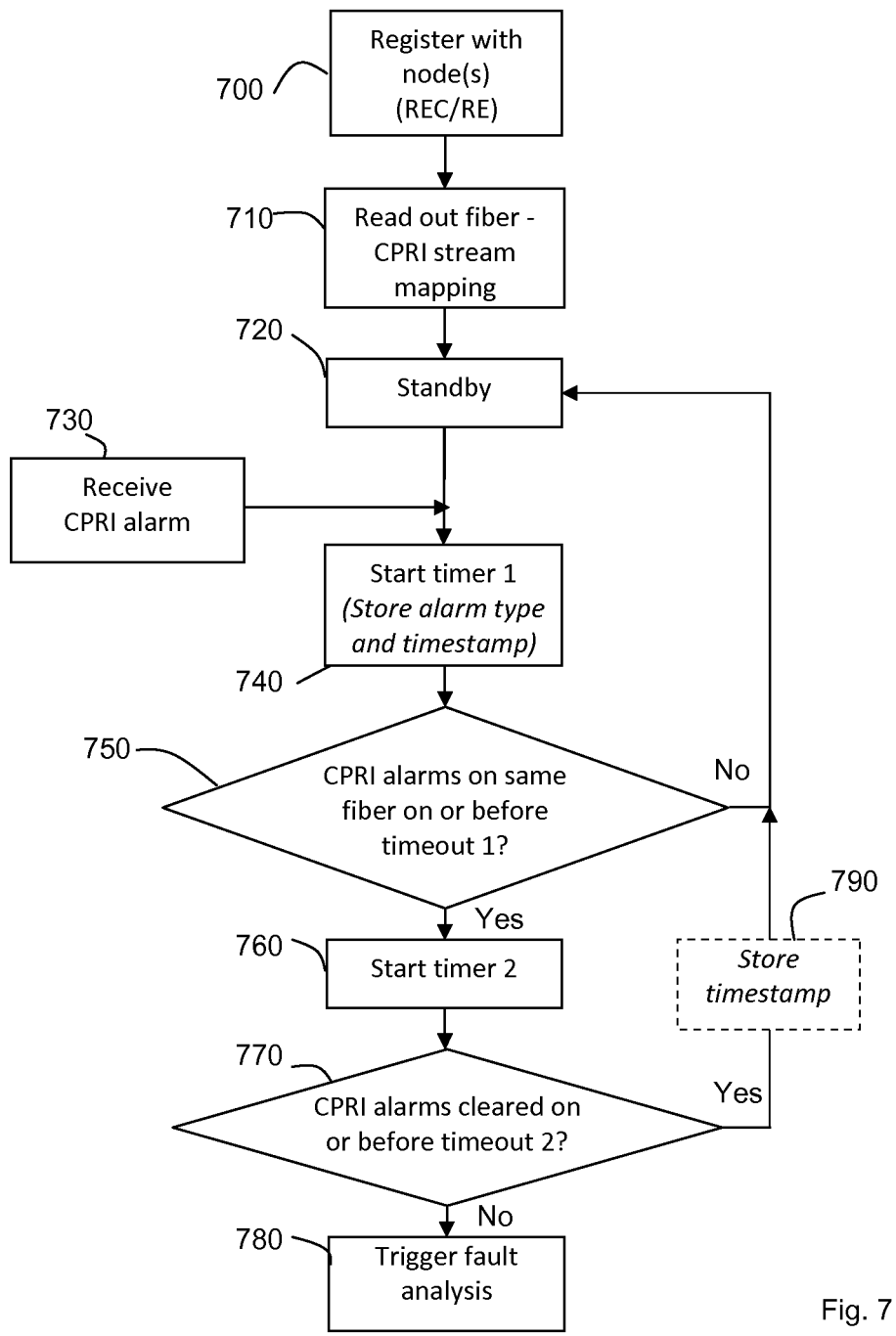
FIG. 7 shows a flowchart illustrating a CPRI-based trigger for optical fiber fault analysis in accordance with the invention, FIG. 8a schematically illustrates a centralised FMS architecture in a distributed RBS with optical-electrical-optical (OEO) conversion between CPRI links, and FIG. 8b schematically illustrates a distributed FMS architecture in a distributed RBS with optical-electrical-optical (OEO) conversion between CPRI links, in accordance with one embodiment of the present invention.

The simplified method of FIG. 6 does not filter out isolated and spurious alarms and thus can lead to unnecessary fiber testing. This is obviated by a more detailed implementation of the trigger module function that is illustrated in FIG. 7. It should be understood that the illustrated steps are the same for different arrangements of the FMS 100 and trigger module as described below.

In a first embodiment of the present invention, the FMS 100 is interfaced with m RECs 10, while each REC 10 is connected with n fibers 1. Each of the n fibers 1 is also connected for monitoring via a coupling module 400 to the FMS 100. A total of i CPRI streams is run over each fiber 1. Each of the m RECs 10 has information about which CPRI stream is run over which physical optical fiber 1. The trigger module 60 is connected with all m RECs 10.

The function of the trigger module 60 according to this first embodiment can be described with reference to FIG. 7. At step 700 the trigger module 60, using the registration/CPRI receiver module 610, registers with the nodes of interest, which in the first embodiment is all m RECs 10. The trigger module 60 then reads out the mapping between fibers and CPRI streams from each REC 10 at step 710. This information is passed to the trigger processor module 620. The trigger processor module 620 then goes into standby pending receipt of an asynchronous CPRI alarm from any REC 10 as shown at step 720. At step 730 an asynchronous CPRI alarm is received from one of the nodes with which the trigger module 60 is registered. The trigger processor module 620 then starts a first timer (timer 1) at step 740. During the time interval set by this first timer 1, it is expected that further CPRI alarms will be generated from the CPRI streams carried by the same fiber if a fiber failure is the cause of the alarm. More specifically, In accordance with this first embodiment, alarms can be received from the i−1 other CPRI streams carried by the same optical fiber. If no further CPRI alarms are received on or before the timeout of timer 1 at step 750, therefore, the method returns to the standby condition at step 720. However, if further alarms are received in the period defined by timer 1, the method moves to step 760 and the trigger processor module 620 sets a second timer (timer 2). This step is intended to filter out spurious alarms. If, at step 770, the CPRI alarms are cleared before or by the timeout of timer 2, the trigger module 60 returns to the standby condition at step 720. However, if the CPRI alarms received are still valid at timeout of timer 2, the method moves to step 780 and the trigger processor module 620 of the trigger module 60 triggers the FMS 100 to perform a measurement on the specific fiber.

In a further variation of this method, the trigger module 60 may, upon receipt of a CPRI alarm, store the CPRI alarm type and a timestamp indicating when the alarm started as indicated in italics in box 740. If an alarm is cleared, the trigger module 60 may likewise store a timestamp of when this alarm is stopped. This is shown at optional step 790. The alarm type and timestamp information can be used as a further parameter in the triggering of maintenance measurements.

While in accordance with the first embodiment, the trigger module 60 registers only with RECs 10, it should be noted that the trigger module 60 may register with any node having an active master port in those situations where the CPRI alarms are not forwarded to RECs 10. This would naturally include REs 20 running CPRI master ports.

In accordance with a second embodiment of the present invention, multiple instances of the registration/CPRI receiver module 610 and trigger processing module 620 of the trigger module 60 are executed in parallel, each connected to one node which may be an REC 10, or to an RE 20 with active master port. This parallel execution may be performed in the same processor 65 connected to all relevant RECs 10, or in several processors. In the latter case, the processors may be located at the nodes, i.e. the REC 10 or RE 20, in the FMS 100 or in a location separate from, but connected to, both entities. The function of each instance of the registration/CPRI receiver and trigger processing modules making up this triggering module 60 in accordance with this embodiment is the same as that illustrated in FIG. 7, and differs from the function for the first embodiment in that each listening module 610 registers with only one node at step 700.

Figure 8A:
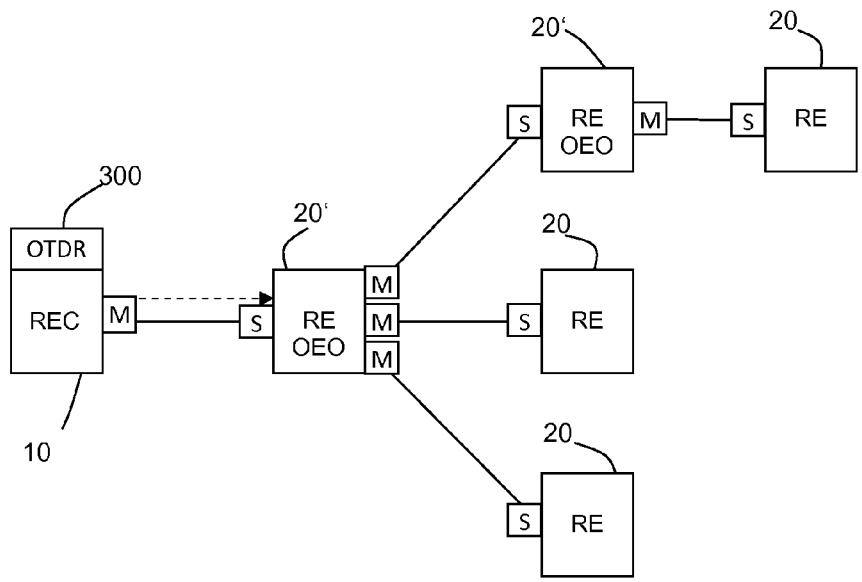
Figure 8B:
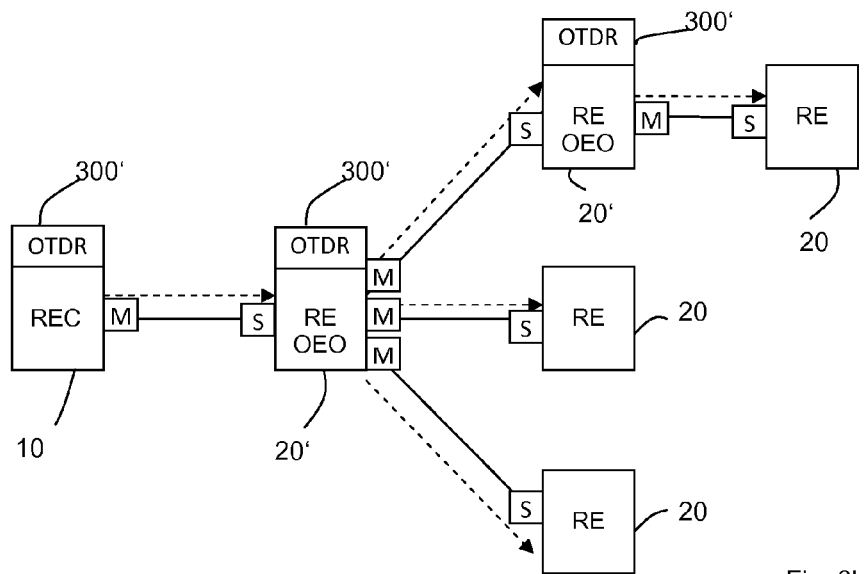

FIGS. 8*a* and 8*b* illustrate part of a distributed RBS based on complex CPRI topologies, such as the one shown in FIG. 4*b*. In this arrangement, traffic from multiple remote units, RE 20, is aggregated and forwarded to the baseband processing unit, or REC 20, over progressively higher capacity CPRI links. CPRI multiplexers contained in the intervening REs are concatenated in order to minimize the number of fiber feeds required to connect an REC 10 to remote REs 20. However, the traffic aggregation is achieved using optical-electro-optical (OEO) conversion. In FIGS. 8*a* and 8*b*, the REs equipped with OEO conversion elements are designated 20' to distinguish these from REs without this functionality. As illustrated in FIG. 8*a*, the intervening REs 20' are equipped with both CPRI slave and master ports, designated "S" and "M", respectively, in the figure, to enable these nodes to terminate a CPRI link with the REC 10 or an earlier RE 20' and establish a CPRI link with a subsequent RE 20. In the arrangement shown in FIG. 8*a* a centralized reflectometry module 300 is coupled to the fiber 1 at the REC 10. This may be achieved by integrating the reflectometry module 300 in the transceiver of the REC 10. As illustrated by the dashed arrow, the reach of the FMS 100 is limited in this configuration as optical pulses transmitted by the reflectometry module 300 do not propagate through the OEO conversion points, RE 20'. Thus only the first feed fiber 1 between the REC 10 and the first RE 20' with OEO can be monitored in this arrangement.

In accordance with a third embodiment of the present invention this problem is alleviated by providing multiple reflectometry modules distributed in the RBS, with each reflectometry module being coupled to a fiber carrying a point-to-point CPRI link. This is illustrated in FIG. 8*b*, where distributed reflectometry modules are designated by 300'. The remaining parts of FIG. 8*b* are identical to FIG. 8*a*. These reflectometry modules 300' are preferably integrated in the optical transceivers of each master port of the CPRI network, although for the sake of clarity the two elements are illustrated separately to facility their identification in the figure. In practice, this means that a reflectometry module 300' is integrated in each REC 10 and also in each RE 20' having one or more master ports and supporting a CPRI link. In this manner all optical fibers connected between OEO conversion circuitry have a dedicated reflectometry module 300'. As shown by the dashed arrows, the effective reach of the FMS extends throughout the network with this configuration. In this arrangement, as for the first embodiment, the trigger module 60 registers with one node, namely the REC 10, using the registration/CPRI receiver module 610. This corresponds to step 700 of FIG. 7. The CPRI alarms related to CPRI streams in any CPRI link downstream of the REC 10 are forwarded to the REC 10 via CPRI, which is unaffected by the OEO in each RE 20' node. The remaining steps are as shown in FIG. 7. When the final step is reached and the FMS is triggered, the FMS 100 controls operation of the distributed reflectometry module 300' coupled to the fiber in question. This is preferably achieved by transmitting control messages using vendor specific data slots available on each CPRI hyperframe. In other words, this embodiment takes advantage of the CPRI framing structure to transmit control messages from the FMS 100 to the reflectometry modules available on the network. Similarly, after the measurement procedure is terminated, the reflectometry modules 300' can forward the results back to the FMS via the optical backhaul network using CPRI, for example via the slow Control and Management (C&M) channel.

The present invention thus also resides in a node of an optical backhaul network that comprises a measurement element configured to perform fault analysis on an optical fiber connected to said node, said measurement element further being configured to communicate with a fiber monitoring system via said optical backhaul network, preferably using CPRI protocol.

While transmission of control signals to reflectometry modules 300 has been described only in relation to distributed reflectometry modules 300' it will be understood that CPRI can be exploited to communicate with all reflectometry modules 300 when these are integrated in a node, 10, 20, 20'.

It will be understood that the use of CPRI alarms to trigger an FMS measurement for analyzing faults on the optical fibers making up the optical backhaul network can be combined with more conventional monitoring whereby each fiber is tested in turn. However, the fact that the CPRI alarms are asynchronous means that a fault analysis can be applied in a rapid and targeted fashion to minimize delays and disruption to traffic.

The invention claimed is:

1. A method of monitoring optical fibers in an optical backhaul network that connects nodes of a distributed radio base station system, wherein the nodes carry data streams using a Common Public Radio Interface (CPRI) protocol, the method comprising:
   receiving, from at least one node, a CPRI alarm indicative of a transmission failure in a CPRI data stream;
   sending a trigger signal to a fiber monitoring system; and initiating fault analysis of an optical fiber identified as carrying the CPRI data stream to which the CPRI alarm relates.

2. The method of claim 1:
further comprising obtaining information from the at least one node, the obtained information mapping CPRI data streams to physical optical fibers;
wherein the triggering fault analysis comprises identifying an optical fiber carrying the CPRI data stream based on the obtained information.

3. The method of claim 1, further comprising ensuring that the CPRI alarm is maintained for at least a predetermined time period before triggering fault analysis of the identified optical fiber.

4. The method of claim 1, further comprising:
ascertaining receipt of at least one CPRI alarm indicative of a transmission failure in a further CPRI data stream carried by the identified optical fiber within a first time interval;
ensuring that all received CPRI alarms indicative of transmission failure on CPRI data streams carried by the identified optical fiber are maintained for a predetermined second time interval;
performing the triggering fault analysis of the identified optical fiber subsequent to the ascertaining and the ensuring.

5. The method of claim 1, wherein the triggering fault analysis comprises:
transmitting a control message via the optical backhaul network to a measurement element in a node coupled to the identified optical fiber; and
receiving measurement data from the measurement element via the node.

6. The method of claim 5, further comprising transmitting the control message using the CPRI protocol.

7. A computer program product stored in a non-transitory computer readable medium for controlling a computer to cause the computer to monitor optical fibers in an optical backhaul network that connects nodes of a distributed radio base station system, wherein the nodes carry data streams using a Common Public Radio Interface (CPRI) protocol, the computer program product comprising software instructions which, when run on one or more processors of the computer, causes the computer to:
receive, from at least one node, a CPRI alarm indicative of a transmission failure in a CPRI data stream;
send a trigger signal to a fiber monitoring system; and
initiate fault analysis of an optical fiber identified as carrying the CPRI data stream to which the CPRI alarm relates.

8. A trigger module configured to trigger fault analysis of optical fibers in an optical backhaul network connecting nodes of a distributed radio base station system, the trigger module configured to communicate with a fiber monitoring system and with at least one node of the optical backhaul network that is configured to terminate at least one data stream using a Common Public Radio Interface (CPRI) protocol, the trigger module comprising:
a receiver configured to receive CPRI alarms from the at least one node, each of the CPRI alarms indicating a transmission failure in a CPRI data stream;
a trigger processing circuit coupled to the receiver and configured to respond to a CPRI alarm received from the at least one node by:
identifying an optical fiber carrying the CPRI data stream to which the alarm relates; and
sending a trigger signal to the fiber monitoring system to initiate fault analysis of the optical fiber identified as carrying the CPRI stream to which the CPRI alarm relates.

9. The trigger module of claim 8, wherein the trigger module further comprises a registration circuit configured to obtain information from the at least one node mapping CPRI data streams to optical fibers carrying the CPRI data streams prior to the trigger module receiving CPRI alarms from the at least one node.

10. The trigger module of claim 8, further comprising a processing circuit configured to:
respond to receipt of a CPRI alarm by setting a timer; and
send the triggering signal to the fiber monitoring system only if the CPRI alarm is maintained upon elapse of an interval defined by the first timer.

11. The trigger module of claim 8, further comprising a processing circuit configured to:
respond to receipt of a CPRI alarm by setting a first timer and a second timer;
set the second timer only if at least one CPRI alarm that relates to a further CPRI stream carried by the identified optical fiber is received during the interval defined by the first timer;
send the triggering signal to the fiber monitoring system only if all received CPRI alarms are maintained upon elapse of an interval defined by the second timer.

12. A fiber monitoring system, comprising:
at least one measurement element configured to perform fault analysis of optical fibers;
a controller circuit; and
a trigger module configured to trigger fault analysis of optical fibers in an optical backhaul network connecting nodes of a distributed radio base station; wherein the trigger module is configured to communicate with at least one node of the optical backhaul network, the node being configured to terminate at least one data stream using a Common Public Radio Interface (CPRI) protocol;
wherein the trigger module comprises:
a receiver configured to receive CPRI alarms from the at least one node, each of the CPRI alarms indicating a transmission failure in a CPRI stream;
a trigger processing circuit coupled to the receiver and configured to respond to a CPRI alarm received from the node by sending a trigger signal to the controller circuit to initiate fault analysis of an optical fiber identified as carrying the CPRI stream to which the CPRI alarm relates by at least one measurement element.

13. The fiber monitoring system of claim 12, wherein the trigger module further comprises a registration circuit configured to obtain information from the at least one node mapping CPRI data streams to optical fibers carrying the CPRI data streams prior to the trigger module receiving CPRI alarms from the at least one node.

14. The fiber monitoring system of claim 12, wherein the trigger module further comprises a processing circuit configured to:
respond to receipt of a CPRI alarm by setting a timer; and
send the triggering signal to the controller only if the CPRI alarm is maintained upon elapse of an interval defined by the first timer.

15. The fiber monitoring system of claim 12, wherein the trigger module further comprises a processing circuit configured to:

respond to receipt of a CPRI alarm by setting a first timer and a second timer;

set the second timer only if at least one CPRI alarm that relates to a further CPRI stream carried by the identified optical fiber is received during the interval defined by the first timer;

send the triggering signal to the controller only if all received CPRI alarms are maintained upon elapse of an interval defined by the second timer.

16. The fiber monitoring system as of claim 12, wherein:

the at least one measurement element is comprised in a node of the optical backhaul network; and the controller circuit is configured to send a control signal to initiate fault analysis to the at least one measurement element via the optical backhaul network.

17. The fiber monitoring system of claim 16, wherein the controller circuit is configured to send the control signal using the CPRI protocol.

18. The fiber monitoring system of claim 12, wherein the controller circuit is further configured to receive fault analysis data from the at least one measurement element via the optical backhaul network.

\* \* \* \* \*